United States Patent [19]

Takayama

[11] Patent Number: 5,276,845
[45] Date of Patent: Jan. 4, 1994

[54] APPARATUS WITH MULTIPLE BUSES FOR PERMITTING CONCURRENT ACCESS TO A FIRST MEMORY BY A PROCESSOR WHILE A DMA TRANSFER IS OCCURRING BETWEEN A SECOND MEMORY AND A COMMUNICATIONS BUFFER

[75] Inventor: Akira Takayama, Hamamatsu, Japan

[73] Assignee: Yamaha Corporation, Hamamatsu, Japan

[21] Appl. No.: 821,896

[22] Filed: Jan. 15, 1992

Related U.S. Application Data

[63] Continuation of Ser. No. 396,902, Aug. 22, 1989, abandoned.

[30] Foreign Application Priority Data

Aug. 25, 1988 [JP] Japan ............... 63-211044

[51] Int. Cl.⁵ ............................ G06F 13/40
[52] U.S. Cl. ......................... 395/425; 395/275; 364/DIG. 1; 364/240.2; 364/242.3; 364/24.92
[58] Field of Search ............... 395/275, 325, 425; 364/DIG.

[56] References Cited

U.S. PATENT DOCUMENTS

| | | | |
|---|---|---|---|
| 4,245,305 | 1/1981 | Gechele et al. | 395/275 |
| 4,263,649 | 4/1981 | Lapp, Jr. | 395/325 |
| 4,371,926 | 2/1983 | Yamaura et al. | 395/275 |
| 4,751,634 | 6/1988 | Burrus, Jr. et al. | 395/275 |
| 4,823,312 | 4/1989 | Michael et al. | 395/250 |
| 4,831,523 | 5/1989 | Lewis et al. | 395/275 |
| 4,870,566 | 9/1989 | Cooper et al. | 395/325 |
| 4,912,636 | 3/1990 | Magar et al. | 395/425 |
| 4,989,135 | 1/1991 | Miki | 395/325 |
| 5,016,165 | 5/1991 | Tanikawa et al. | 395/425 |
| 5,072,420 | 12/1991 | Conley et al. | 395/425 |

FOREIGN PATENT DOCUMENTS

| | | |
|---|---|---|
| 61-271555 | 12/1986 | Japan . |
| 62-128348 | 6/1987 | Japan . |
| 62-231367 | 10/1987 | Japan . |
| 63-40951 | 2/1988 | Japan . |

OTHER PUBLICATIONS

The Zilog Product Specification, "Z8530 SCC Serial Communication Controller", Feb., 1981, pp. 259–268.
Rockwell Product Description Order No. 705, "R68560, R68561 Multi-Protocol Communications Controller (MPCC)", Document No. 68650N06, Rev. 4, Oct. 1984, pp. 1-86 through 1-91.
Osborne, A., An Introduction to Microcomputers; vol. 1 1980 pp. 5-88-5-93.

Primary Examiner—Thomas C. Lee
Assistant Examiner—John C. Loomis
Attorney, Agent, or Firm—Burns, Doane, Swecker & Mathis

[57] ABSTRACT

Communication-control equipment having data-processor, primary storage for storing process data of the data-processor, secondary storage for storing DMA data as well as the process data, and DMA bus for transferring only the DMA data communicated between the secondary storage and a transmission or receiving buffer. The data-processor can communicate with the primary storage during DMA data transfer, because the DMA data are transferred through the DMA bus and so the address bus and data bus connecting data-processor and the primary storage are available during the DMA transfer.

6 Claims, 2 Drawing Sheets

APPARATUS WITH MULTIPLE BUSES FOR PERMITTING CONCURRENT ACCESS TO A FIRST MEMORY BY A PROCESSOR WHILE A DMA TRANSFER IS OCCURRING BETWEEN A SECOND MEMORY AND A COMMUNICATIONS BUFFER

This application is a continuation of application Ser. No. 07/396,902, filed Aug. 22, 1989, now abandoned.

BACKGROUND OF THE INVENTION

1. Field of the Invention

The present invention relates to communication-control equipment that has a DMA (direct memory access) function.

2. Prior Art

FIG. 1 is a block diagram showing a configuration of a conventional data processing circuit 100. In FIG. 1, numeral 1 designates an ALU (Arithmetic and Logic Unit) that has a common computing function but does not have a function for handling the bus state (empty or busy), and numeral 2 designates a read/write memory. Numeral 3 designates a DMA controller which responds to a DMA request from outside and produces control signals for controlling transfer of input data to memory 2 or output data therefrom. Numeral 4 designates a DMA control register which includes a request bit RQ and an acknowledge bit AK. Request bit RQ is set by a DMA request, while acknowledge bit AK indicates that DMA is under operation. ALU 1, memory 2, and DMA controller 3 are interconnected through data bus DB and address bus AB. Address bus AB specifies an address of memory 2 by using address data thereon. Data bus DB transfers data between memory 2 and ALU 1, or between memory 2 and an external storage via DMA controller 3. Each of address bus AB and data bus DB is provided with switches SW along the way, and ALU 1 can communicate with memory 2 when switches SW are in the "on" state.

The operation of data processing circuit 100 is as follows:

In the normal operation mode, request bit RQ and acknowledge bit AK in DMA control register 4 are both "0". Switches SW are in the "on" state, because acknowledge bit AK is "0", and ALU 1 is connected to memory 2 through address bus AB and data bus DB. As a result, ALU 1 can communicate with memory 2 to read or write data.

When DMA request signal HLDRQ is provided to DMA controller 3, request bit RQ in DMA control register 4 is set by DMA controller 3. When ALU 1 detects request bit RQ being set and is not using memory 2 at that time, ALU 1 sets acknowledge bit AK, and turns off switches SW to disconnect ALU 1 from memory 2. DMA controller 3 also detects request bit RQ being set, and outputs DMA acknowledge signal HLDAK to indicate that the DMA is granted. After that, the DMA operation is carried out as follows:

When data from outside are written to memory 2, DMA controller 3 reads data in an external memory not shown and places the data on data bus DB. At the same time, DMA controller 3 supplies a write address to memory 2 via address bus AB. The data on data bus DB is written to the designated address in memory 2. On the other hand, when data in memory 2 are written to an external memory, DMA controller 3 supplies read address to memory 2 via address bus AB, reads the data of the designated address in memory 2, and transfers the read data through data bus DB. This data is transferred under the control of DMA controller 3 and is written into the external memory.

When the DMA operation above is completed, DMA controller 3 resets acknowledge bit AK in DMA control register 4. As a result, switches SW are turned on again, connecting ALU 1 and memory 2. Thus, ALU 1 can communicate with memory 2 to transfer data.

The conventional data processing circuit 100, however, has a following disadvantage: ALU 1 cannot access memory 2 during the DMA operation because ALU 1 is disconnected from memory 2. As a result, ALU 1 cannot execute the process until the DMA operation is completed. This hinders an application of the conventional data processing circuit to a circuit such as communication-control equipment that necessitates a real time process.

SUMMARY OF THE INVENTION

It is therefore an object of the present invention to provide communication-control equipment in which the ALU can access the memory and continue to process the data even during the DMA operation.

In one aspect of the present invention, there is provided communication-control equipment having communication buffer means for storing communication data, and controlling communication of the communication data with an external terminal, the communication-control equipment comprising:

(a) data-processing means;
(b) primary storing means for storing process data of the data-processing means;
(c) bus means connected between the data-processing means and the primary storing means for transferring the process data;
(d) secondary storing means for storing the process data and the communication data;
(e) DMA bus means connected between the secondary storing means and the communication buffer; and
(f) DMA control means for controlling the transfer of the communication data by using the DMA bus means.

DESCRIPTION OF THE PREFERRED EMBODIMENTS

The invention will now be described with reference to the accompanying drawings.

Figure 1:
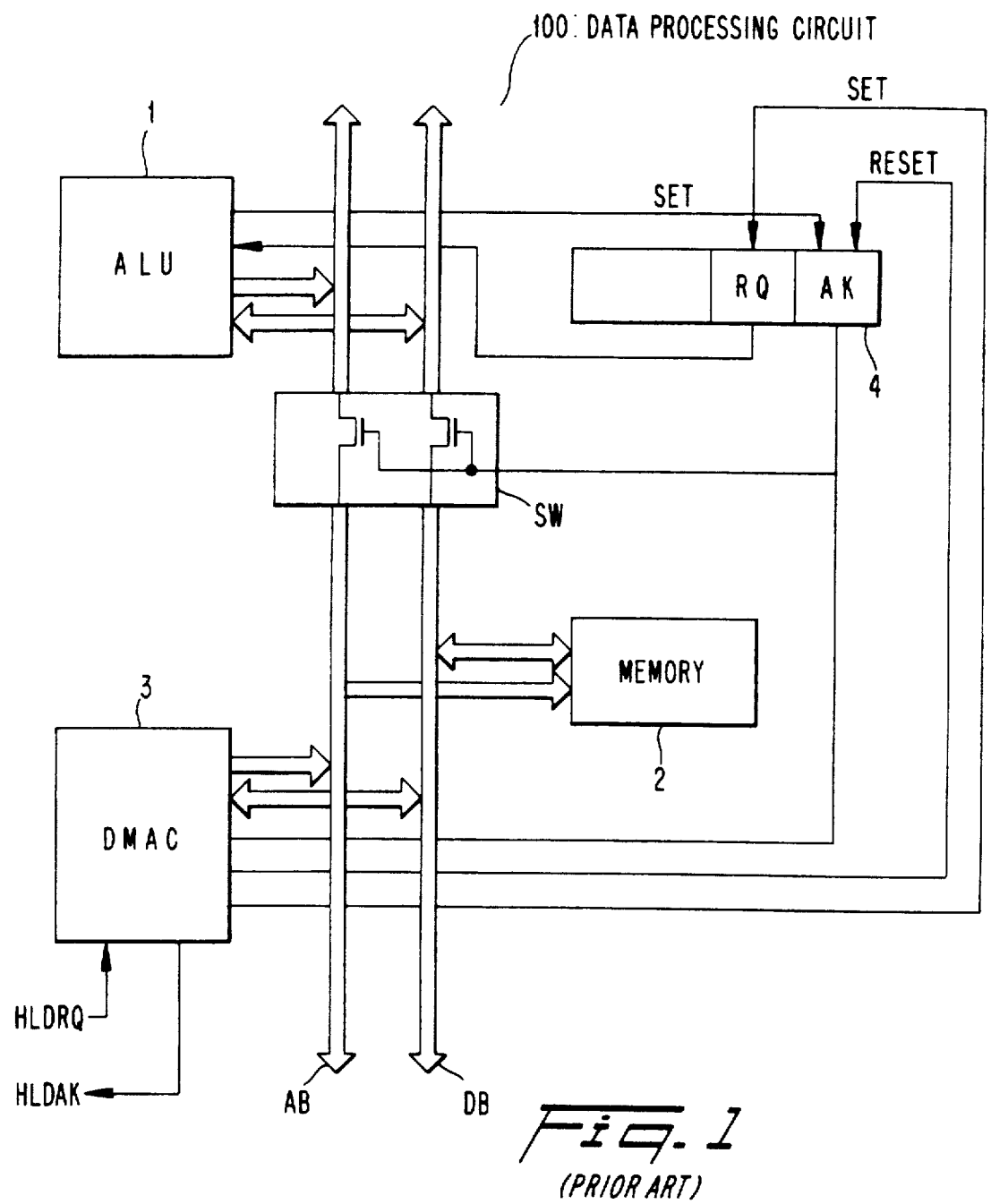
FIG. 1 is a block diagram showing a typical configuration of a conventional data processing circuit.
Figure 2:
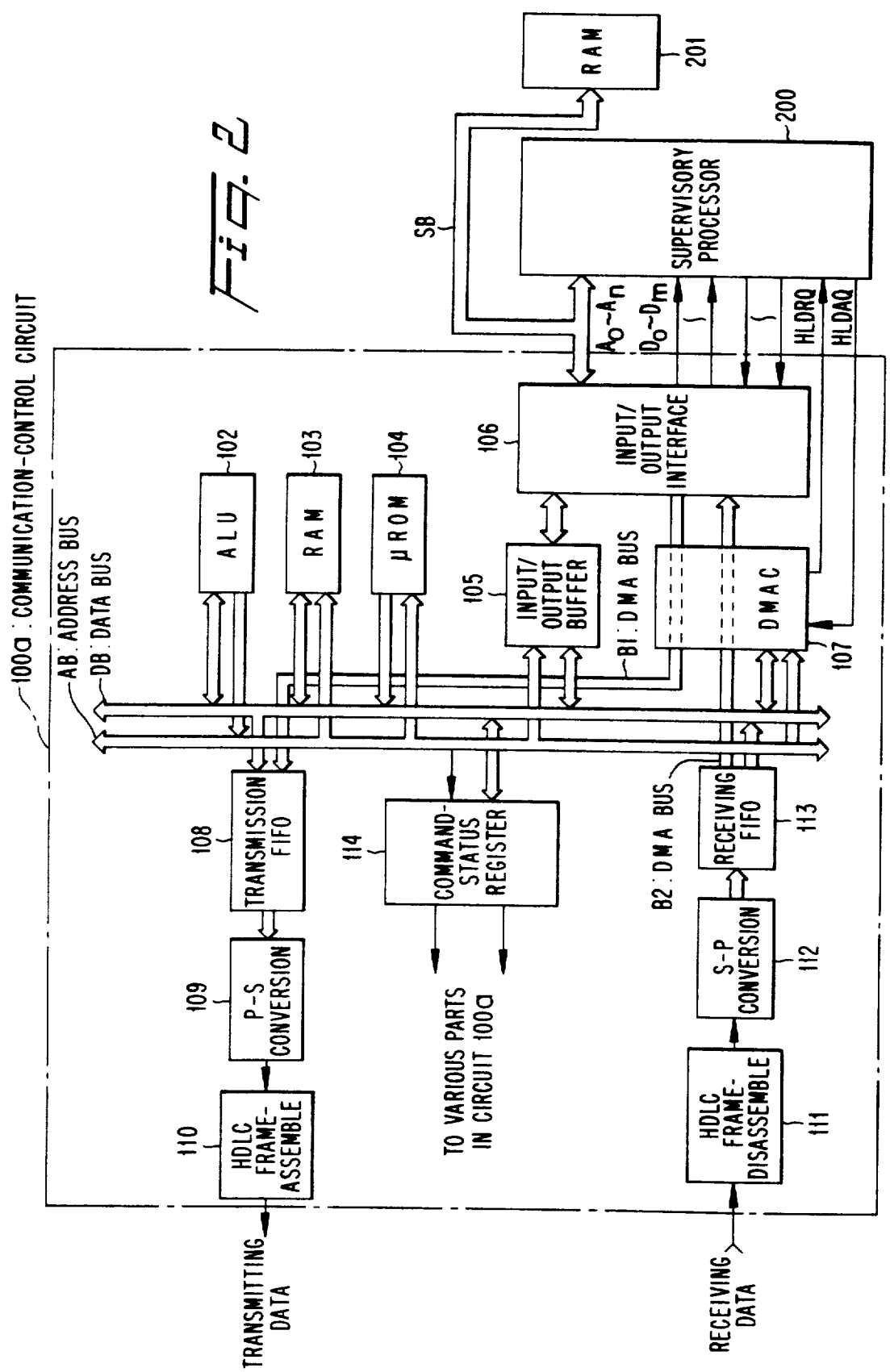
FIG. 2 is a block diagram showing a configuration of communication-control equipment according to an embodiment of the present invention.

FIG. 2 is a block diagram showing communication-control equipment according to an embodiment of the present invention. The communication-control equipment comprises communication-control circuit 100a which communicates with external terminals, a supervisory processor 200 that executes supervisory processing over communication-control circuit 100a, and RAM 201. These circuits are interconnected through system bus SB and control lines.

Communication-control circuit 100a has ALU 102 which includes an accumulator for computing. ALU 102 is connected to address bus AB at the address output terminal, and to data bus DB at the data output terminal. Numeral 103 designates a RAM which temporarily stores macro-instructions or the results of the computation. RAM 103, whose address is designated by the address data on address bus AB, inputs or outputs data through data bus DB. Numeral 104 designates a micro-program ROM that stores micro-programs describing the macro-instructions. The micro-program ROM 104 outputs the micro-program codes to data bus DB when address data denoting a macro-instruction is applied to micro-program ROM 104 through address bus AB.

Numeral 105 designates an input/output buffer which is connected to address bus AB, data bus DB, and input/output interface 106. This input/output buffer 105 temporarily stores the data communicated between communication-control circuit 100a and supervisory processor 200. Input/output interface 106 connects input/output buffer 105 and DMA controller 107 to supervisory processor 200 and RAM 201, so that input/output interface 106 controls data communications therebetween. DMA controller 107, which is connected to data bus DB, DMA bus B1 and B2, and input/output interface 106, produces control signals in response to a DMA request and controls the DMA operation between the memories (RAM 103, transmission FIFO 108, and receiving FIFO 113) in communication-control circuit 100a and RAM 201.

Numeral 108 designates a transmission FIFO (first-in-first-out) register, 109 designates P/S-(parallel to serial)-conversion circuit, and 110 designates HDLC (High-level Data Link Control)-frame-assemble circuit. These circuits work when data are sent from communication-control circuit 100a to the outside:

First, transmission-FIFO register 108 receives the data on data bus DB or on DMA bus B1, and stores the data sequentially. The FIFO register 108 includes a selector that selects the data either on data bus DB or on DMA bus B1 according to the selection signal from ALU 102, and stores the selected data.

Second, P/S-conversion circuit 109 receives the oldest FIFO data from transmission-FIFO register 108 and converts the oldest FIFO data (parallel data) into serial data. Thus, the data in transmission-FIFO register 108 are sequentially supplied to P/S-conversion circuit 109 and are converted into serial data.

Third, HDLC-frame-assemble circuit 110 puts the data from P/S-conversion circuit 109 together into a frame consisting of a number of blocks, each block including 8-bit serial data. Each frame includes the starting flag, the address field, the control field, the data field, the FCS (frame check sequence), and the closing flag. These frames are sent according to the transmission protocol similar to that of HDLC protocol.

Numeral 111 designates a HDLC-frame-disassemble circuit, 112 designates S/P (serial to parallel)-conversion circuit, and 113 designates receiving-FIFO register. HDLC-frame-disassemble circuit 111 removes the starting flag, address field, control field, FCS and closing flag from the received frame in the HDLC format, and outputs the data field in a serial-data form. S/P-conversion circuit 112 converts the serial data into 8-bit parallel data, and outputs the parallel data. Receiving-FIFO register 113 sequentially stores the parallel data from S/P-conversion circuit 112, and supplies the oldest stored data to data bus DB and DMA data bus B2.

Numeral 114 designates a command-status register that produces control information on the basis of data on address bus AB and data bus DB, and feeds the control data to various parts in communication-control circuit 100a.

OPERATION OF THE EMBODIMENT

Now, the operation of the communication-control equipment will be described.

(A) NORMAL OPERATION MODE

In the normal operation mode, ALU 102 communicates with RAM 103 or micro-program ROM 104 through address bus AB and data bus DB: ALU 102 places address data on address bus AB, and reads via data bus DB the data stored at the address in RAM 103 specified by the address data. ALU 102 computes on the basis of the read data. When ALU 102 executes a macro-instruction and requires micro-program codes stored in micro-program ROM 104, ALU 102 enables micro-program ROM 104 through address bus AB, and reads the necessary micro-program codes therefrom via data bus DB. ALU 102, combining these operations, executes computations.

(B) DMA MODE

The DMA mode is required when the communication-control equipment communicates with an external terminal. To start the communication, communication-control circuit 100a carries out communication-initiation processes with the external terminal. When the process is completed, communication-control circuit 100a initiates the data communication. During the communication, receiving data from the external terminal are supplied from receiving-FIFO register 113 to RAM 201 in the DMA mode, and transmission data are sent from RAM 201 to transmission FIFO register 108 in the DMA mode to be sent outside therefrom.

The DMA operation during data transmission of the stored data in RAM 201 to the external terminal, is performed as follows:

(1) Supervisory processor 200 outputs a top address of the data to be sent in RAM 201 and a count value indicating the length of the data to system bus SB. These data are sent to ALU 102 by way of system bus SB, input/output interface 106, input/output buffer 105, and data bus DB.

(2) ALU 102 sets the top address and count value to the address counter and data counter in DMA controller 107, respectively.

(3) ALU 102 also sets the following data to transmission-FIFO register 108 via data bus DB before the data transmission: a TEI (Terminal Endpoint Identifier) and SAPI (Service Access Point Identifier) of the peer terminal, and the control information relating to the data transmission.

(4) Transmission-FIFO register 108 switches the selector included therein (not shown) under the control of ALU 102, so that transmission-FIFO register 108 can read the DMA data on DMA bus B1. Thus, the DMA transfer from RAM 201 to transmission-FIFO register 108 is put on standby.

(5) DMA controller 107 sends DMA request signal HLDRQ to supervisory processor 200.

(6) Supervisory processor 200 relinquishes control of system bus SB when system bus SB is idle, and sends DMA acknowledge signal HLDAK to DMA controller 107.

(7) DMA controller 107 sends the output data of the address counter to RAM 201 as read-address data by way of input/output interface 106 and system bus SB.

(8) As a result, a piece of stored data in RAM 201 is retrieved therefrom, and is supplied to transmission- FIFO register 108 by way of system bus SB, input/output interface 106, and DMA bus B1.

(9) When the piece of stored data is transferred by the DMA operation, the address counter is incremented by 1 and the data counter is decremented by 1 in DMA controller 107. After that, supervisory processor 200 takes over the control of system bus SB again.

(10) DMA controller 107 tests if the content of the data counter becomes "0". When the test result is "NO", DMA controller 107 repeats the DMA transfer as described above.

(11) When the data counter in DMA controller 107 becomes "0", the DMA transfer is completed.

The DMA transfer above does not use address bus AB and data bus DB in communication-control circuit 100a during data transfer. Consequently, ALU 102 can access RAM 103 and micro-program ROM 104 via address bus AB and data bus DB. In addition, supervisory processor 200 does not have its process interrupted by the DMA operation, because even if DMA controller 107 produces a DMA request, supervisory processor 200 needs not relinquish system bus SB when the bus is used to access RAM 103 or 201.

Thus, the DMA data transfer from RAM 201 to transmission-FIFO register 108 is carried out. At the same time, data transmission is executed: the stored data in transmission-FIFO register 108 are sequentially read to be sent to the peer terminal through P/S-conversion circuit 109 and HDLC-frame-assemble circuit 110.

The DMA data transfer of the received data, that is, the DMA data transfer from receiving-FIFO register 113 to RAM 201 is performed in a manner similar to that described above.

Although a specific embodiment of communication-control equipment constructed in accordance with the present invention has been disclosed, it is not intended that the invention be restricted to either the specific configuration or the uses disclosed herein. Modifications may be made in a manner obvious to those skilled in the art. Accordingly, it is intended that the invention be limited only by the scope of the appended claims.

What is claimed is:

1. A communication-control apparatus for controlling communications transmitted externally of the communication-control apparatus, said communication-control apparatus comprising:
   (a) data-processing means;
   (b) communication buffer means for storing communication data, and controlling communication of said communication data externally of said communication-control apparatus;
   (c) primary storing means for storing process data of said data-processing means;
   (d) secondary storing means for storing communication data;
   (e) first bus means for coupling said communication buffer means, said data processing means and said primary storing means and for transferring said process data between said data-processing means and said primary storing means;
   (f) second bus means for coupling said data processing means and said primary storing means, and for transferring address information between said data processing means and said primary storing means;
   (g) third bus means for coupling said communication buffer means and said secondary storing means, and for transferring said communication data between said secondary storing means and said communication buffer; and
   (h) control means, connected to said communication buffer means and said secondary storing means through said third bus means, for controlling a direct memory access transfer of said communication data for transferring communication data between said secondary storing means and said communication buffer through said third bus means and allowing said data-processing means to access said primary storing means through said first bus means during direct memory access.

2. Communication-control apparatus according to claim 1, wherein said communication buffer means includes a transmission-FIFO register and a receiving-FIFO register.

3. Communication-control apparatus according to claim 1, wherein said data-processing means, said first bus means and said third bus means further include: means for establishing a data-transfer route which directs external communications to said secondary storing means or a route which directs external communications to said primary storing means, said route being selected according to characteristics of said communication data.

4. Communication-control apparatus according to claim 1 further comprising supervisory processing means for transferring process data of said supervisory processing means to said secondary storing means as communication data.

5. Communication-control apparatus according to claim 1, wherein said communication buffer means includes means for selecting said third bus under control of said data-processing means after said data-processing means communicates control information with said communication buffer means so that said communication buffer means performs direct memory access of said secondary storing means without using said first bus means.

6. A communication-control apparatus for controlling external communications comprising:
   (a) a communication FIFO memory for storing communication data to be transmitted to an external output of said communication-control apparatus;
   (b) first bus connectable with said communication FIFO memory;
   (c) a DMA bus connectable with said communication FIFO memory;
   (d) a first memory connectable with said first bus;
   (e) a processor connected to said communication FIFO memory and said first memory through said first bus;
   (f) a second memory connectable with said DMA bus for storing said communication data;
   (g) a DMA controller connected between said DMA bus and said second memory for transmitting said communication data from said second memory to said communication FIFO memory through said DMA bus, allowing said processor to access said first memory through said first bus while said DMA controller transmits communication data between said second memory and said communication FIFO memory.

* * * * *